(12) United States Patent
Ge et al.

(10) Patent No.: US 11,187,460 B2
(45) Date of Patent: Nov. 30, 2021

(54) DEVICE AND METHOD FOR REINFORCING RECYCLED AGGREGATE BASED ON IN-SITU C-S-H PRODUCTION

(71) Applicant: SHANDONG UNIVERSITY, Shandong (CN)

(72) Inventors: Zhi Ge, Jinan (CN); Huaqiang Yuan, Jinan (CN); Renjuan Sun, Jinan (CN); Yanhua Guan, Jinan (CN); Xuechi Gao, Jinan (CN); Yufeng Bi, Jinan (CN); Zhichao Xue, Jinan (CN); Yanqiu Hu, Jinan (CN); Yujie Feng, Jinan (CN); Jiajie Wu, Jinan (CN); Xinlei Hu, Jinan (CN); Jin Qin, Jinan (CN); Yikai Wang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 20 days.

(21) Appl. No.: 16/633,299

(22) PCT Filed: Dec. 27, 2018

(86) PCT No.: PCT/CN2018/124119
§ 371 (c)(1),
(2) Date: Jan. 23, 2020

(87) PCT Pub. No.: WO2020/093560
PCT Pub. Date: May 14, 2020

(65) Prior Publication Data
US 2021/0231371 A1    Jul. 29, 2021

(30) Foreign Application Priority Data
Nov. 9, 2018   (CN) .......................... 201811331818.6

(51) Int. Cl.
*F26B 21/02* (2006.01)
*C04B 18/16* (2006.01)
(Continued)

(52) U.S. Cl.
CPC ............ *F26B 21/02* (2013.01); *C04B 18/167* (2013.01); *C04B 20/023* (2013.01); *F26B 25/08* (2013.01)

(58) Field of Classification Search
CPC .......... F26B 21/02; F26B 21/00; F26B 25/00; F26B 25/08; C04B 18/167; C04B 20/023
(Continued)

(56) References Cited

U.S. PATENT DOCUMENTS 2,235,559 A * 3/1941 Mayer ..................... F26B 21/02
34/442
4,334,484 A * 6/1982 Payne ........................ C10J 3/20
110/101 CD
(Continued)

FOREIGN PATENT DOCUMENTS

CA   3003605 A1 * 5/2017 ............. F26B 21/02
CN   203319869 U   12/2013
(Continued)

OTHER PUBLICATIONS

Aug. 1, 2019 International Search Report issued in International Patent Application No. PCT/CN2018/124119.
(Continued)

*Primary Examiner* — Stephen M Gravini
(74) *Attorney, Agent, or Firm* — Oliff PLC

(57) ABSTRACT

A device and method for reinforcing recycled aggregate based on in-situ C—S—H production including a first, second, third chamber, and a blast drier. A spray structure arranged on the top of the third chamber; the first and second chamber connected to the spray structure through pumps. A
(Continued)

hollowed container arranged at the bottom of the spray structure. A certain gap reserved between the bottom of the container and the bottom of the third chamber, the bottom of the third chamber is provided with at least one drain outlet; the blast drier connected to the bottom of the third chamber, and a cover is arranged on the top of the third chamber. The first chamber contains calcium hydroxide solution. The second chamber contains a mixed solution of TEOS, water and anhydrous ethanol. The container is arranged in the third chamber, and the container is used to contain to-be-treated recycled aggregate.

10 Claims, 4 Drawing Sheets

(51) Int. Cl.
  *C04B 20/02* (2006.01)
  *F26B 25/08* (2006.01)
(58) Field of Classification Search
  USPC .......................................................... 34/222
  See application file for complete search history.

(56) References Cited

U.S. PATENT DOCUMENTS

| | | | | |
|---|---|---|---|---|
| 5,207,176 A * | 5/1993 | Morhard | ................ | F23G 5/006 |
| | | | | 110/101 CC |
| 5,252,221 A * | 10/1993 | van Dommelen | ........ | A23J 1/06 |
| | | | | 210/645 |
| 6,692,669 B2 * | 2/2004 | Mischo | .................. | C04B 26/26 |
| | | | | 264/115 |
| 6,944,970 B2 * | 9/2005 | Silverbrook | ........... | B41J 11/002 |
| | | | | 101/389.1 |
| 6,955,052 B2 * | 10/2005 | Primlani | ................. | F23L 7/002 |
| | | | | 60/776 |
| 7,134,285 B2 * | 11/2006 | Primlani | .................. | F23R 7/00 |
| | | | | 60/784 |
| 7,984,566 B2 * | 7/2011 | Staples | ................. | F26B 17/103 |
| | | | | 34/90 |
| 7,987,613 B2 * | 8/2011 | Ness | ......................... | C10L 9/08 |
| | | | | 34/138 |
| 8,020,313 B2 * | 9/2011 | Palmer | .................... | F26B 11/16 |
| | | | | 34/60 |
| 8,297,278 B2 * | 10/2012 | Harmer | ............ | A61M 15/0048 |
| | | | | 128/203.21 |
| 8,407,912 B2 * | 4/2013 | Hubbard, Jr. | ........ | A01N 1/0278 |
| | | | | 34/82 |
| 9,802,838 B2 * | 10/2017 | Gstoettenmayr | ......... | C02F 1/20 |
| 10,016,739 B2 * | 7/2018 | Kuppler | ................ | C04B 28/188 |
| 10,399,098 B2 * | 9/2019 | Bright | ....................... | F26B 1/00 |
| 10,648,731 B2 * | 5/2020 | Grunewald | ................ | C08F 2/01 |
| 10,868,337 B2 * | 12/2020 | Chen | .................... | H01M 50/148 |
| 2002/0117090 A1 | 8/2002 | Ku | | |
| 2017/0342233 A1 * | 11/2017 | Oliveira | ............. | C22B 21/0069 |

FOREIGN PATENT DOCUMENTS

| | | | |
|---|---|---|---|
| CN | 104058622 A | 9/2014 | |
| CN | 105174766 A | 12/2015 | |
| CN | 106277883 A | 1/2017 | |
| CN | 106495516 A | 3/2017 | |
| CN | 107382114 A | 11/2017 | |
| WO | WO-2017079468 A1 * | 5/2017 | ............. B05B 5/043 |

OTHER PUBLICATIONS

Aug. 1, 2019 Written Opinion of the International Searching Authority issued in International Patent Application No. PCT/CN2018/124119.

* cited by examiner

DEVICE AND METHOD FOR REINFORCING RECYCLED AGGREGATE BASED ON IN-SITU C-S-H PRODUCTION

BACKGROUND

Technical Field

The present invention relates to the technical field of recycled concrete aggregate, and in particular to a device and a method for reinforcing recycled aggregate based on in-situ C—S—H production.

Related Art

In recent years, with the constant progress of the Chinese society and the rapid development of science, technology and economy, China has been striving to develop infrastructures. The civil buildings and mileage of roads and highways are rapidly increasing. As a construction material with high bearing capability and excellent performance, concrete has been widely applied in civil and transportation engineering. China consumed about 2 billion cubic meters of commercial concrete in 2017. As an important raw material for concrete production, natural sand and gravel are unrenewable resources. In the past, as natural sand and gravel were wide in resource and low in price, they were wantonly mined, and as a result, high-quality natural sand and gravel are becoming short nowadays. Yet, in the future all industries still have a tremendous demand on concrete and will consume a gigantic amount of high-quality natural sand and gravel due to the development of the society, so we have to seek some new materials to replace natural sand and gravel in order to save and protect the resources. In another aspect, in the progress of urbanization, about two hundred million square meters of old buildings are demolished per year in China, producing about four hundred million tons of construction and demolition (C&D) waste, which accounts for 30% to 40% of the total amount of urban waste and 50% to 60% of which is waste concrete. Most of the building waste is land filled so it not only occupies the valuable space but also causes environmental concerns. With proper approach, C&D waste could be used to produce recycled aggregate. Recycling C&D waste could resolve both issues of waste pollution and shortage of natural resources.

Therefore, researchers had conducted a lot of studies on recycled aggregate. In particular, a technology for producing concrete with recycled concrete from C&D waste has tremendous social, environmental, and economic benefits, and is a hot topic that various countries in the world are concerned about. In 1950s, the Soviet Union and Germany carried out researches on recycled concrete technology in succession. In 1976, the International Union of Laboratories and Experts in Construction Materials, Systems and Structures (RILEM) established the Technical Committee 37-DRC (Demolition and Reuse of Concrete) (TC-37-DRC) to start the research on the treatment and recycling of waste, and moreover, in 1982, a conference with the topic of producing recycled concrete with recycled aggregate was held in Copenhagen. Japan was the first country in the world to recycle waste concrete. It has established numbers of laws and regulations and built factories for treating building waste to ensure the recycling of building waste. The recycling rate of building waste has reached over 98%. Countries, such as America, Netherlands, Denmark, etc. have also enacted relevant laws and regulations. Compared with some developed countries, China started the research on recycled concrete relatively late due to sufficient natural sand resource, but has also made a lot of achievements. Many experts and scholars in China have made a large number of researches on the improvement of the physical properties, mechanical properties, structural properties and so on of recycled concrete.

At present, research in China mainly focuses on the properties of recycled concrete, but there are few researches on recycled aggregate. However, the properties of recycled aggregate affect the properties of concrete significantly. Due to the large variation of properties of recycled aggregate and sources, direct use will lead to the great variation of recycled concrete. Typically, the large crush machine is adapted to produce recycled aggregate. The machine could gradually reduce the grain size of the recycled aggregate and remove the old mortar from the aggregate. However, this process will also cause micro-cracks inside aggregate. In addition, because the crushed recycled aggregate still contains a great deal of cement mortar and a lot of micro-cracks formed in the process of crushing, not only is the strength of the aggregate decreased, but also the recycled aggregate has the characteristics of high porosity, high water absorption rate, high water absorption speed, etc. These will cause adverse influence on the workability, mechanical properties and durability of the recycled concrete.

SUMMARY

On the basis of producing in-situ C—S—H, the present invention provides a device and a method for reinforcing recycled aggregate to solve the issues related with high variation, low strength and high water absorption of recycled aggregate.

In order to solve the aforementioned technical problems, the technical solution of the present invention is as follows:

A device for reinforcing recycled aggregate based on in-situ C—S—H production comprises three sealed chambers, namely a first chamber, a second chamber and a third chamber, and a blast drier, and the first chamber, the second chamber and the third chamber are sealed.

A spray structure is arranged on the top of the third chamber. The first chamber and the second chamber are connected to the spray structure through pumps. A container with hollowed walls is arranged on the bottom of the spray structure. The hollow is smaller than the grain size of the recycled aggregate. A certain gap is reserved between the bottom of the container and the bottom of the third chamber. The bottom of the third chamber is provided with at least one drain outlet.

The blast drier is connected to the bottom of the third chamber, and a cover is arranged on the top of the third chamber.

The first chamber is used to contain a calcium hydroxide solution. The second chamber is used to contain a solution mixed with tetraethoxysilane (TEOS), water and anhydrous ethanol. A container is arranged in the third chamber to contain to-be-treated recycled aggregate. The calcium hydroxide solution and the mixed solution (TEOS, water and anhydrous ethanol) are respectively pumped into the spray structure on the top of the third chamber by using pumps and sprayed to the to-be-treated recycled aggregate for the spraying and soaking treatment. After the mixed solution of TEOS, water and anhydrous ethanol is absorbed by the recycled aggregate, in internal voids of the recycled aggregate, TEOS is hydrolyzed to silica sol with pozzolanic activity which can react with calcium hydroxide to form calcium silicate hydrate (C—S—H) with gelation property in the voids within a certain depth range, filling the internal voids of the recycled aggregate and repairing various microcracks. As all the walls of the container are hollowed, the sprayed solutions may be conveniently sprayed to soak the recycled aggregate, and once the soaking process is completed, the solutions in the container are easily drained off. As a certain gap is reserved between the bottom of the container and the bottom of the third chamber, the whole liquid in the container can be conveniently drained. At this moment, when the blast drier is switched on to dry the aggregate, the degree of drying can be easily increased.

Preferably, a plurality of spray heads is arranged on the spray structure, and a spray area of the spray heads uniformly covers the cross section of the container.

Preferably, two gas distributors are arranged between the blast drier and the third chamber, and the two air distributors are symmetrically arranged on two sides of the third chamber. The blast drier symmetrically blows drying wind into the third chamber, which is more favorable for the uniform drying of the recycled aggregate.

Preferably, the device for reinforcing recycled aggregate based on in-situ C—S—H production further includes a vacuum device, and the vacuum device connects to the third chamber.

More preferably, two connection points are arranged between the third chamber and the vacuum device, and the two connection points are symmetrically arranged relative to third chamber. The symmetric arrangement of the connection points can enable the third chamber to more easily achieve a vacuum negative pressure state to accelerate the permeation of the solutions into the recycled aggregate, increasing the efficiency of reinforcing the recycled aggregate and shortening the time of recycled aggregate treatment.

Preferably, there are two drain outlets, which are respectively connected to the first chamber and the second chamber to recycle the solutions after spray soaking.

A method for reinforcing recycled aggregate based on in-situ C—S—H production includes the following steps:

(1) removing mud on a surface of recycled aggregate.

(2) loading the cleaned recycled aggregate into a container, and placing the container into the third chamber;

(3) switching on the blast drier, switching off the blast drier after the recycled aggregate in the third chamber is dried, and then switching on a vacuum device to vacuumize the third chamber;

(4) conveying the mixed solution of anhydrous ethanol, water and TEOS into a spray device of the third chamber; evenly spraying the calcium hydroxide solution onto the recycled aggregate by the spray device; and after a period of spraying and soaking, discharging out the solution and switching on the blast drier to dry the recycled aggregate;

(5) switching on the vacuum device to vacuumize the third chamber; and (6) conveying a calcium hydroxide solution into the spray device of the third chamber; evenly spraying the calcium hydroxide solution onto the recycled aggregate by the spray device; and after a period of spraying and soaking, discharging out the and switching on the blast drier to dry the recycled aggregate.

Preferably, in step (4), a molar ratio of anhydrous ethanol to water to TEOS is 3.5-4.5:1:2.5-3.5.

Preferably, in step (4), the soaking time is 10 to 20 h.

Preferably, in step (6), the calcium hydroxide solution is a saturated calcium hydroxide solution, and a preparation method of the calcium hydroxide solution includes: preparing the saturated calcium hydroxide solution, and slightly separating out calcium hydroxide.

More preferably, the time of soaking the recycled aggregate in the calcium hydroxide solution is 10 to 20 h.

The beneficial effects of the present invention are as follows:

As a nano-silicon precursor, TEOS has a small monomer structure and a low consistence. TEOS can easily permeate into the recycled aggregate under the drive of vacuum, and is hydrolyzed into silica sol with the pozzolanic activity, which can react with calcium hydroxide to form calcium silicate hydrate (C—S—H) with gelation property in the voids within a certain depth range, filling the internal voids of the recycled aggregate and repairing various microcracks. Therefore, the compactness of the external surface of the recycled aggregate is increased, the strength of the recycled aggregate is increased and the water absorption rate of the recycled aggregate is decreased. Consequently, the utilization rate of building waste is increased. Moreover, the properties of recycled concrete can be improved. Unlike the other methods (such as the mortar wrapping method) for externally treating recycled aggregate, the method prevents defects (such as poor bonding or hollowing and shedding) that may occur during external treatment.

BRIEF DESCRIPTION OF THE DRAWINGS

The drawings of the specification which constitute part of the present application are used to provide the further understanding of the present application, and the exemplary embodiments of the present application and the description thereof are used to explain the present application, and do not constitute an improper limitation to the present application.

Figure 1:
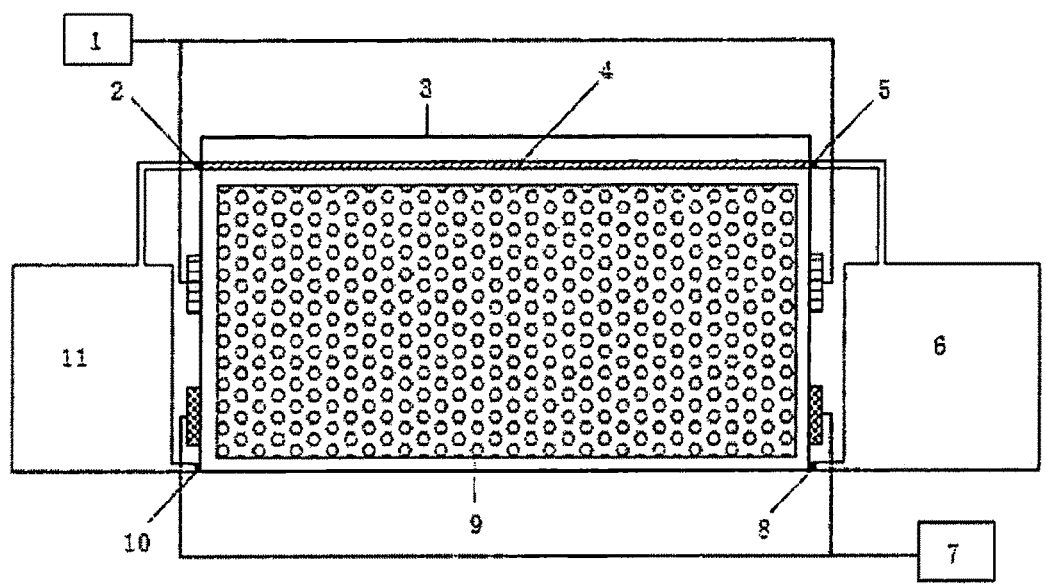
FIG. 1 is a schematic diagram of the recycled aggregate device in the present invention.

In the drawings, 1. Vacuum device; 2. Valve A; 3. Third chamber; 4. Solution spray device; 5. Valve B; 6. Second chamber; 7. Blast drier; 8. Valve D; 9. Recycled aggregate container; 10. Valve C; and 11. First chamber.

DETAILED DESCRIPTION

It should be pointed out that the following detailed description is illustrative, and is intended to provide the further description of the present application. Unless otherwise specified, all the technological and scientific terms used herein have the same meanings as generally understood by those of ordinary skill in the art covering the present application.

It should be noted that the terms used herein are merely intended to describe the specific embodiments rather than limit the exemplary embodiments according to the present application. As used herein, unless otherwise explicitly specified in the context, the singular form is also intended to include the plural form, and in addition. It should also be understood that, in the present specification, the terms "include" and/or "comprise" indicate the existence of features, steps, operations, devices, components and/or their combination.

Embodiment 1

The present embodiment can be used for a factory for mass-reinforcing recycled aggregate based on the in-situ C—S—H production method, see FIG. 1. The present invention can integrate a variety of functions, such as cleaning of recycled aggregate, reinforcement of recycled aggregate, drying of recycled aggregate. The treated recycled aggregate can be used directly for the concrete production and its modified strength and water absorption rate can be kept for a long time. The device for treating recycled aggregate mainly includes a first chamber 11, a second chamber 6, a third chamber 3, a vacuum device 1, a solution spray device 4, a recycled aggregate container 9, and a blast drier 7.

The first chamber 11, the second chamber 6 and the third chamber 3 are connected to each other. A plurality of valves is arranged between the chambers (FIG. 1), namely valve A2, valve B5, valve D8, and valve C10. The shape and volume of each chamber are not limited, but each chamber must have good sealing performance, which can be used to store solutions. The first chamber 11 is a calcium hydroxide solution storage chamber, which is connected to the third chamber 3. The Valve A2 and valve C10 are located on the connecting pipe. Through this pipe, the calcium hydroxide solution can flow to the third chamber 3 or back to the first chamber 11 for recycling. The first chamber 11 can be used for the preparation or replacement of the calcium hydroxide solution. The second chamber 6 is a storage chamber for the mixed solution of anhydrous ethanol, water and TEOS. The second chamber 6 is connected to the third chamber 3, Valve B5 and valve D8 are designed on the connecting pipe. Through the connecting pipe, the mixed solution can flow to the third chamber 3 or back to the third chamber 3 for recycling. The second chamber 6 can be used for the preparation or replacement of the mixed solution (the mixed solution of anhydrous ethanol, water and TEOS). The third chamber 3 is the main reinforcing place for the recycled aggregate. The to-be-treated recycled aggregate is sequentially soaked in the mixed solution (the mixed solution of anhydrous ethanol, water and TEOS), the calcium hydroxide solution and dried in the third chamber 3.

The vacuum device is arranged at the outside of the third chamber 3. Vacuuming orifices are symmetrically arranged on two sidewalls of the third chamber 3. The vacuum device is connected to the vacuuming orifices to vacuumize the third chamber 3. The symmetric arrangement of the vacuuming orifices can facilitate the third chamber 3 to achieve a vacuum negative pressure state to accelerate the permeation of the solution into the recycled aggregate, increasing the efficiency of reinforcing the recycled aggregate and shortening the time period for the recycled aggregate treatment.

The solution spray device is located on the top of the third chamber 3 and above the recycled aggregate container. Its spraying area fully covering the recycled aggregate container. It can evenly spray the solution to the first chamber 11 and the second chamber 6 so that the aggregate can be sufficiently and completely soaked.

The recycled aggregate container 9 is a cover-less cuboid with a function of containing the to-be-treated recycled aggregate. Four sides of the recycled aggregate container are designed to be hollow. The hollowed parts are smaller than the recycled aggregate. The bottom of the recycled aggregate container 9 is slightly higher than the bottom of the third chamber 3 to ensure that the redundant solution can be gathered to flow back to the first chamber 11 (or the second chamber 6) via the valve C10 (or the valve D8) after the sufficient soaking of recycled aggregate through spraying.

The blast drier is arranged on the bottom of the third chamber 3, and is connected to sidewalls of the third chamber 3 through two connection points. The two connection points are symmetrically arranged on the sidewalls of the third chamber 3. The recycled aggregate in the third chamber 3 can be easily dried.

The specific steps are as follows:

(1) Sieving of recycled aggregate:

The crushed recycled aggregates were sieved using a square hole sieve. Aggregates having grain size between 9.5 and 13.2 mm were used for the subsequent test.

(2) Cleaning of aggregate:

The recycled aggregate sieved in step (1) was washed by clean water to clean the mud or incompletely stripped mortar attached to the surface of the aggregate. The recycled aggregate was loaded into the recycled aggregate container 9 after the cleaning. The recycled aggregate container 9 was then put into the third chamber. All the valves were closed.

(3) The blast drier 7 in the third chamber 3 was switched on to dry the recycled aggregate in the third chamber 3.

(4) The blast drier 7 was switched off. The third chamber being sealed was ensured. The vacuum device 1 was switched on to render the third chamber 3 under a vacuum negative pressure state. Afterwards, the vacuum device 1 was switched off.

(5) Preparation of saturated calcium hydroxide solution:

An appropriate amount of clean water was added into the first chamber 11. Afterwards, calcium oxide powder was slowly added and constant stirring was performed until the solution became turbid and precipitates occurred. Then a small amount of calcium oxide was excessively added.

(6) Preparation of mixed solution of anhydrous ethanol, water and TEOS:

All the materials were weighed according to the proportion listed in table 1. All the materials were sequentially added into the second chamber 6 and gentle stirring was performed to mix the solution uniformly. The second chamber 6 was sealed to prevent the volatilization of ethanol.

(7) The valve B5 was opened to convey the mixed solution of anhydrous ethanol, water and TEOS in the second chamber 6 to the solution spray device 4 in the third chamber 3. The mixed solution was then evenly sprayed onto the aggregate at a constant speed. After the aggregate fully absorbed the mixed solution, the redundant mixed solution flowed to the bottom of the third chamber 3. The valve D8 was opened. The gathered mixed solution was pumped back into the second chamber 6 using the pump placed between valve D8 and the second chamber 6. In this way, the mixed solution could be recycled continuously. The process of spraying the mixed solution of anhydrous ethanol, water and TEOS lasted for 12 h.

Vessels must be sealed to prevent ethanol volatizing, which affects the test result significantly.

(8) After the mixed solution for synthesizing nano-silica based on a sol-gel method was sprayed for the last time, the mixed solution was recovered into the second chamber 6, and the valve B5 and the valve D8 were then closed. The blast drier 7 in the third chamber 3 was switched on to dry the recycled aggregate treated in step (8).

(9) The blast drier 7 was switched off. The third chamber 3 being sealed was ensured. The vacuum device 1 was switched on to render the third chamber 3 under a vacuum negative pressure state. The vacuum device 1 was switched off.

(10) The valve A2 was opened to convey the calcium hydroxide solution in the first chamber 11 to the solution spray device 4 in the third chamber 3, the calcium hydroxide solution is then evenly sprayed onto the aggregate at a constant speed, and after the aggregate fully absorbed the calcium hydroxide solution, the redundant calcium hydroxide solution flowed the bottom of the third chamber 3. The valve C10 was opened. The gathered calcium hydroxide solution was pumped back into the first chamber 11 using the pump placed between the valve C10 and the first chamber 11. In this way, the calcium hydroxide solution could be recycled continuously. The process of spraying the calcium hydroxide solution lasted for 12 h.

(11) After the last time calcium hydroxide solution spraying, the calcium hydroxide solution completely flowed back into the first chamber 1. The valve A2 and the valve C10 were closed. The blast drier 7 in the third chamber 3 was switched on to dry the recycled aggregate treated in step (11).

(12) Test steps (7)-(11) could be repeated according to requirements.

(13) The treated recycled aggregate in the third chamber 3 was collected. Their water absorption and crushing values were measured according to Chinese standard JTG E42—2005.

Figure 2:
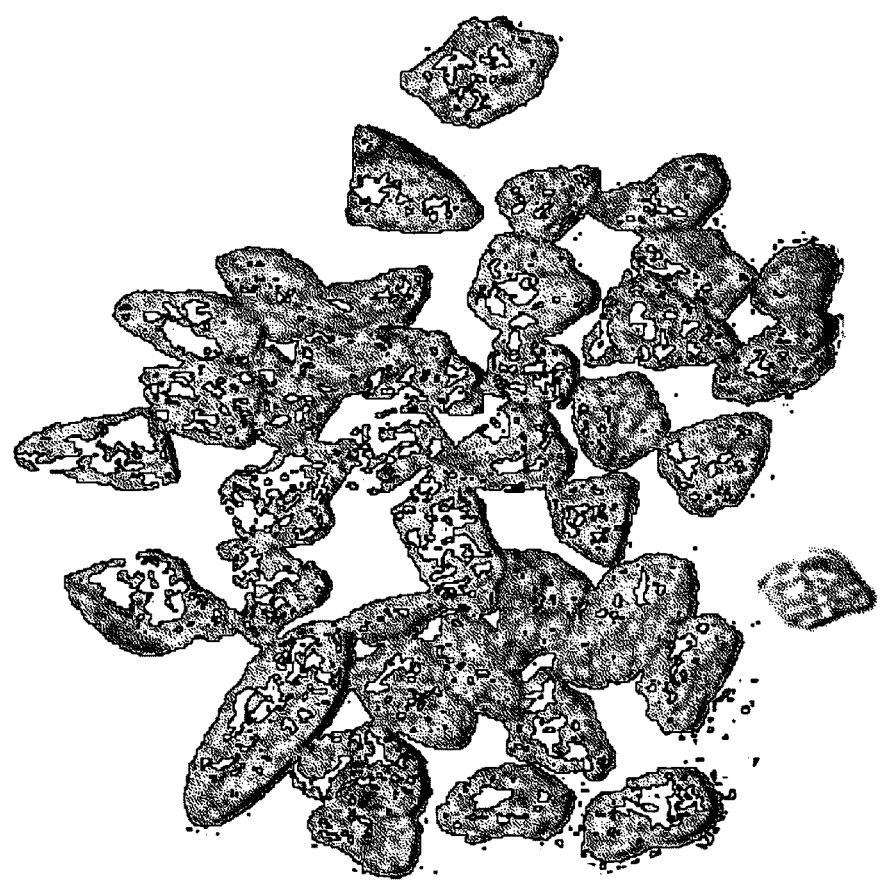
FIG. 2 is a picture of treated recycled aggregate using the present invention.
Figure 3:
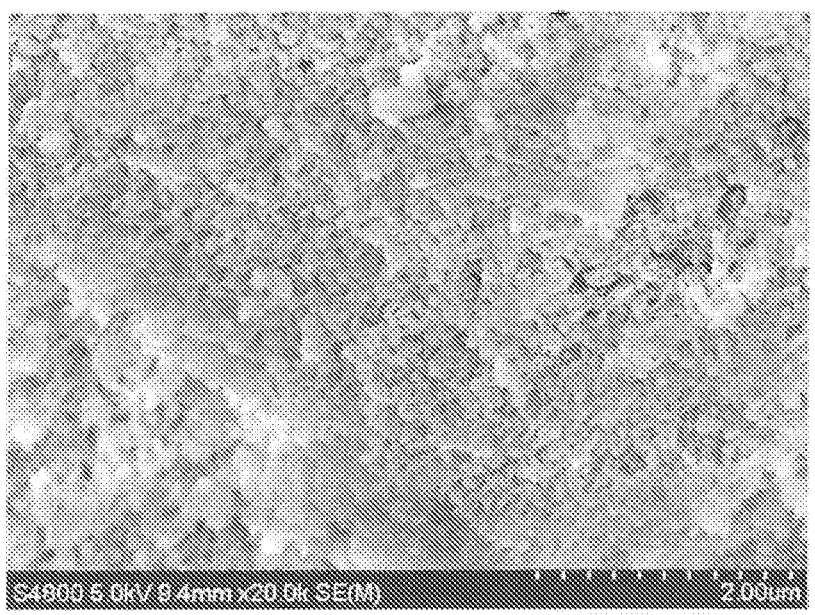
FIG. 3 is a picture of the products in voids of the treated recycled aggregate.
Figure 4:
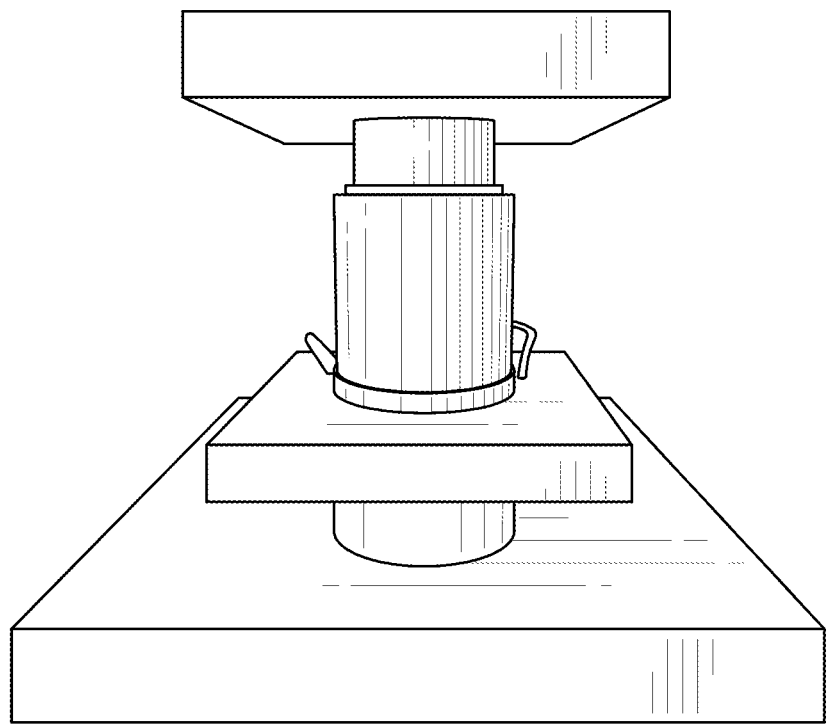
FIG. 4 is a crushing value test for the recycled aggregate.
Figure 5:
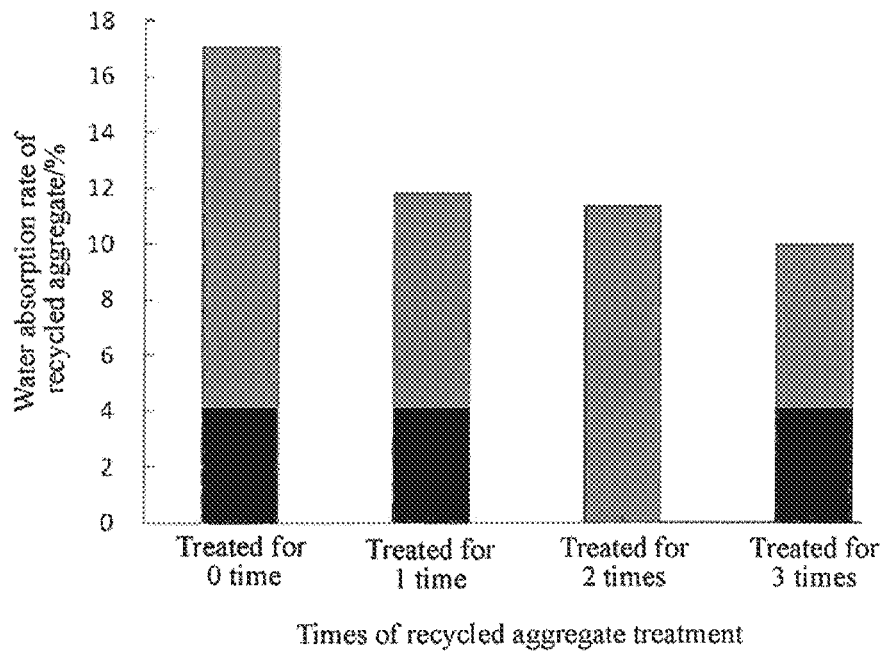
FIG. 5 is a water absorption rate graph of the recycled aggregate.
Figure 6:
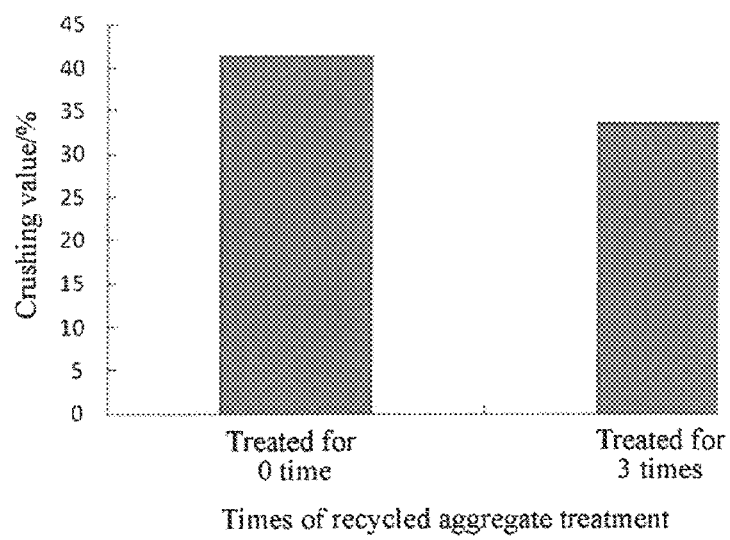
FIG. 6 is a crushing value graph of the recycled aggregate.
Figure 7:
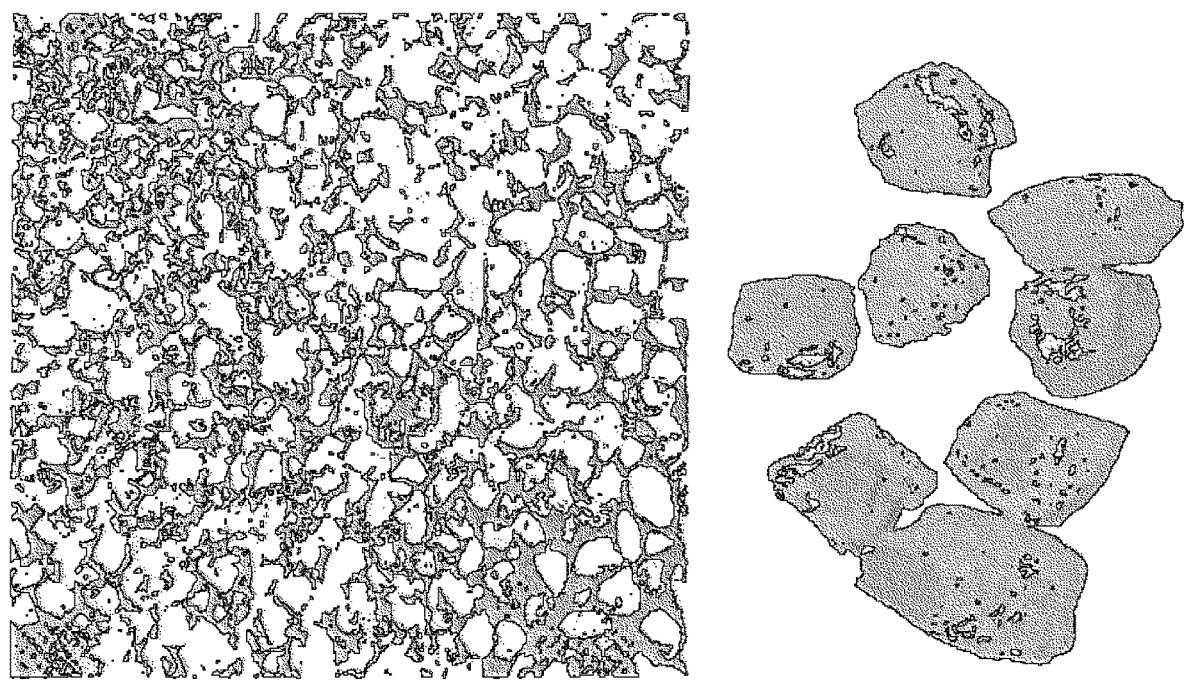
FIG. 7 is a picture of the crushed recycled aggregate.

The treated recycled aggregate is shown in FIG. 2. Products in voids of the treated recycled aggregate are shown in FIG. 3. Set-up of crushing value test is shown in FIG. 4. Water absorption rate and crushing value test results are respectively shown in FIG. 5 and FIG. 6. The crushed aggregate is shown in FIG. 7.

TABLE 1

Mixture proportion of the mixed solution for synthesizing nano-silica based on the sol-gel method.

| Material name | Anhydrous ethanol | Distilled water | TEOS |
|---|---|---|---|
| Proportion | 4 | 1 | 3 |

The aforementioned pictures and test data indicate that the recycled aggregate treatment method provided by the present invention can remarkably decrease the water absorption of the recycled aggregate, increase the strength of the recycled aggregate and decrease the crushing value of the recycled aggregate. It can be seen in FIG. 4 that the water absorption rate of the recycled aggregate decreases from 17% to 10%. It decreased by 41% in comparison with the water absorption rate of untreated recycled aggregate. It can be seen from FIG. 5 that the crushing value of the recycled aggregate decreases from 41% before treatment to 33% after treatment using the method provided by the present invention. Crushing value of the recycled aggregate decreases by 20%. It can be concluded that, by using the novel recycled aggregate reinforcing method, the solutions can effectively permeate into the aggregate. The C—S—H produced by reaction can fill micro-cracks and voids in the recycled aggregate so that the compactness of the surface of the recycled aggregate is increased and the porosity of the recycled aggregate is decreased. Therefore, the objectives of decreasing the water absorption rate of the recycled aggregate and increasing the strength of the recycled aggregate are achieved.

The technological progress achieved by the process and the device for reinforcing recycled aggregate based on in-situ C—S—H production using the present invention are remarkable. Through the simple and easy-to-implement process, the properties of recycled aggregate can be improved effectively with low economic investment. Consequently, the working performance, mechanical properties and durability of recycled aggregate concrete are improved, and the utilization rate of recycled aggregate is increased.

The aforementioned embodiment is merely a preferred case of the present application and is not used to limit the present application. For those skilled in the art, the present application may have various changes and variations. Any modification, equivalent replacement, improvement and so on which are made within the spirit and principle of the present application shall fall within the protection scope of the present application.

What is claimed is:

1. A device for reinforcing a recycled aggregate based on in-situ C—S—H production, the device comprising: a first chamber, a second chamber, a third chamber, and a blast drier, wherein
    the first chamber, the second chamber, and the third chamber are sealed;
    a spray structure is arranged at a top of the third chamber, the first chamber and the second chamber are connected to the spray structure through pipes and pumps, a container with hollowed walls is arranged on a bottom of the spray structure, hollowed portions of the hollowed walls are smaller than a grain size of the recycled aggregate, a certain gap is reserved between a bottom of the container and a bottom of the third chamber, the bottom of the third chamber is provided with at least one drain outlet; and
    the blast drier is connected to the bottom of the third chamber, and a cover is arranged on a top of the third chamber.

2. The device according to claim 1, wherein a plurality of spray heads is arranged on the spray structure, and a spray area of the spray heads uniformly covers a cross section of the container.

3. The device according to claim 1, wherein two gas distributors are located between the blast drier and the third chamber, and the two gas distributors are symmetrically arranged on two sides of the third chamber.

4. The device according to claim 1, wherein the device for reinforcing recycled aggregate based on in-situ C—S—H production further comprises a vacuum device which connects to the third chamber.

5. The device according to claim 4, wherein two connection points are arranged between the third chamber and the vacuum device, and the two connection points are symmetrically arranged relative to the third chamber.

6. The device according to claim 1, wherein there are two drain outlets, which are respectively connected to the first chamber and the second chamber.

7. A method for reinforcing a recycled aggregate based on in-situ C—S—H production, the method comprising:
    1) sieving the recycled aggregate to remove waste particles in the recycled aggregate, and removing mud and incompletely stripped mortar on a surface of the recycled aggregate;
    2) loading the recycled aggregate into a container after cleaning the recycled aggregate, and placing the container in a third chamber;
    3) switching on a blast drier, switching off the blast drier after the recycled aggregate in the third chamber is dried, and then switching on a vacuum device to vacuumize the third chamber;

4) conveying a mixed solution of anhydrous ethanol, water and tetraethoxysilane (TEOS) into a spray device of the third chamber; evenly spraying the mixed solution onto the recycled aggregate by the spray device; and after a first period of soaking, discharging out the mixed solution and switching on the blast drier to dry the recycled aggregate;

5) switching on the vacuum device to vacuumize the third chamber;

6) conveying a calcium hydroxide solution into the spray device on the third chamber; evenly spraying the calcium hydroxide solution onto the recycled aggregate by the spray device; and after a second period of soaking, discharging out the calcium hydroxide solution and switching on the blast drier to dry the recycled aggregate.

8. The method according to claim 7, wherein, in step 4), a molar ratio of anhydrous ethanol to water to TEOS is 3.5-4.5:1:2.5-3.5.

9. The method according to claim 8, wherein the second period of soaking is 10 to 20 h.

10. The method according to claim 7, wherein, in step 6), the calcium hydroxide solution is a saturated calcium hydroxide solution; and the second period of soaking is 10 to 20 h.

\* \* \* \* \*